United States Patent

[11] 3,548,970

| [72] | Inventor | Ralph W. Hutchens, Sr.<br>P.O. Box 128, Toano, Va. 23168 |
|---|---|---|
| [21] | Appl. No. | 750,246 |
| [22] | Filed | Aug. 5, 1968 |
| [45] | Patented | Dec. 22, 1970 |

[54] SCAFFOLDING AND MATERIAL HANDLING SYSTEM
18 Claims, 10 Drawing Figs.

[52] U.S. Cl. .................................................. 182/129, 182/141; 198/158
[51] Int. Cl. .................................................. E04g 1/06
[50] Field of Search .......................................... 182/43, 132, 141, 178, 129, 148; 198/157, 158

[56] References Cited
UNITED STATES PATENTS

| 2,328,386 | 8/1943 | McCann | 198/158X |
| 2,543,348 | 2/1951 | Briese | 182/129X |
| 2,829,780 | 4/1958 | Boor | 198/157X |
| 2,997,126 | 8/1961 | Morgen | 182/148 |
| 3,018,842 | 1/1962 | Abrell | 182/141X |

Primary Examiner—Kenneth Downey
Attorney—Mason, Fenwick and Lawrence

ABSTRACT: A vertically extendible scaffolding and material handling system in which the scaffolding is supported on vertically movable carriages connected to vertical frame members having rack means extending along their length. The rack means being formed by rods connected between the legs of a channel member forming the vertical members and the carriage including guide rollers engaging tracks laterally extending from the channel member and a motor driven pinion engaging the rack means for moving the scaffolding in a vertical direction. The material handling portion of the invention includes a vertical chain conveyor system for lifting materials from a lower level to an upper work level for subsequent movement by a horizontal conveyor at the upper work level. Moreover, an additional feature comprises a supplemental material lifting elevator movable along a vertical frame member by a motor driven pinion means engaging the rack of the vertical frame member with which it is associated. Vertically aligned frame members are connected by a rigid connector received within the channel within the space between the legs of the channel and the outer rods so that a series of such vertical elements can be connected one above the other to increase the height of the scaffolding.

INVENTOR
RALPH W. HUTCHENS, SR.
BY Mason, Fenwick & Lawrence
ATTORNEYS

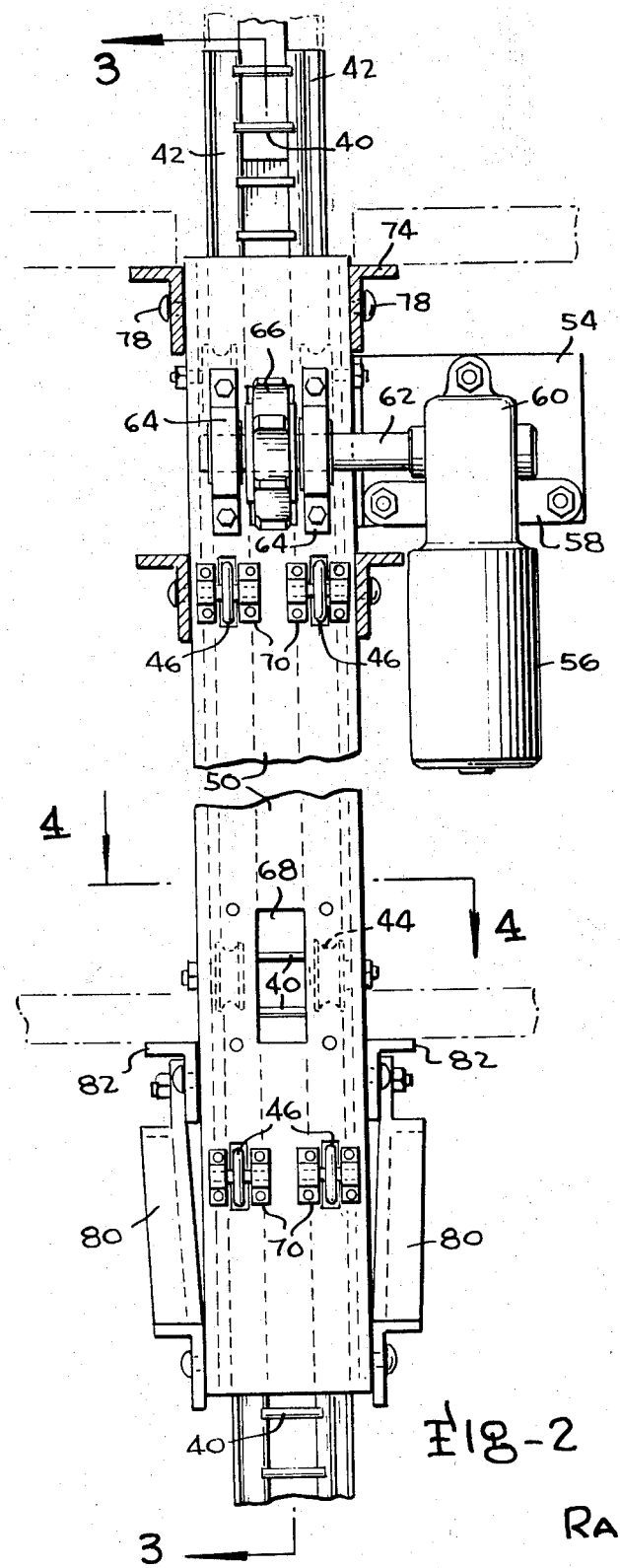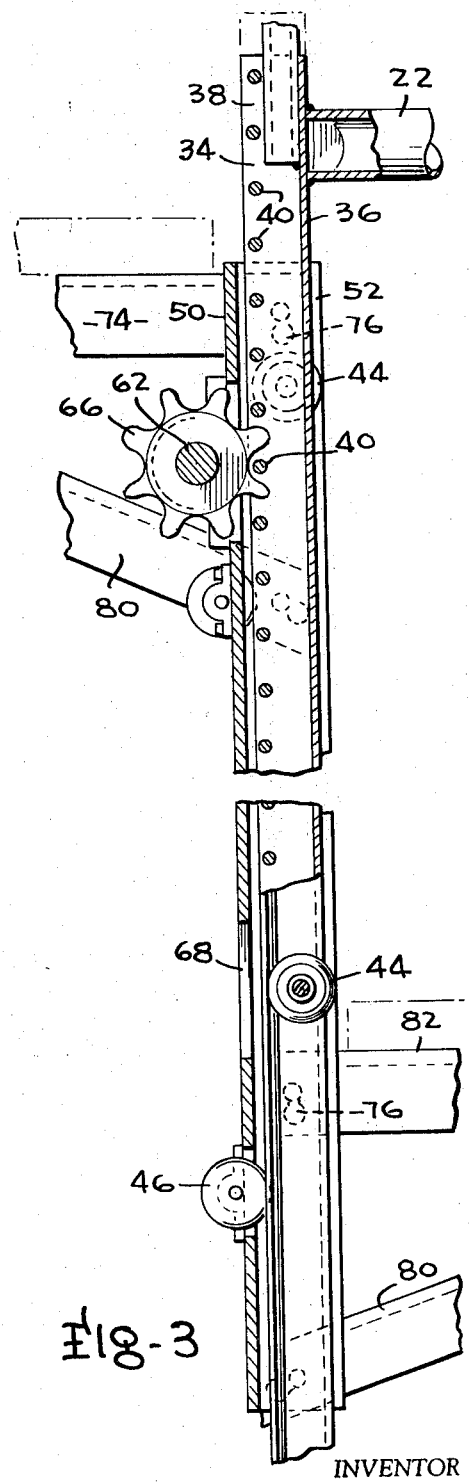

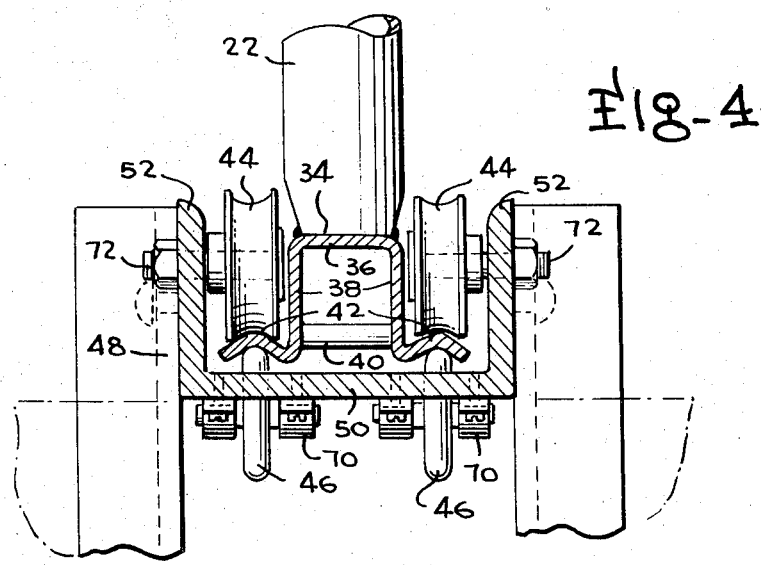
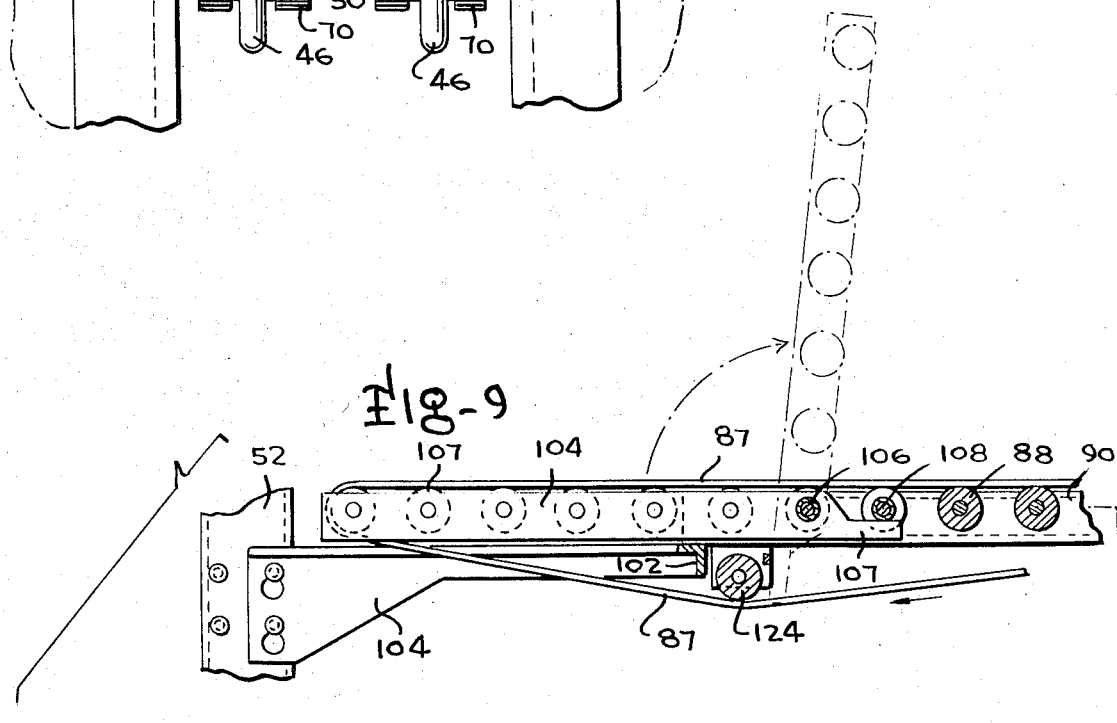
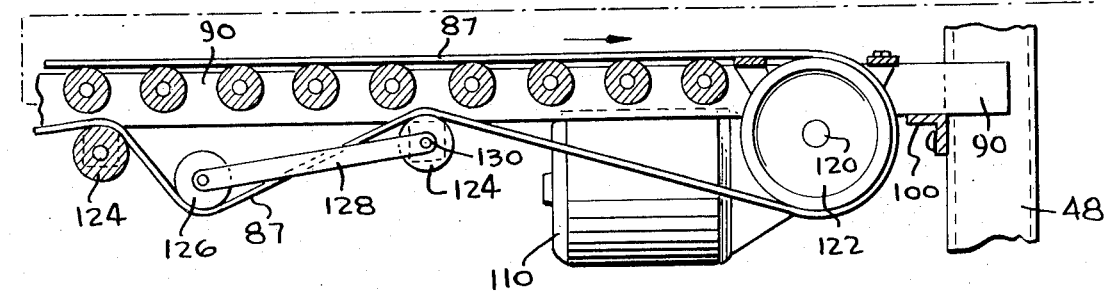

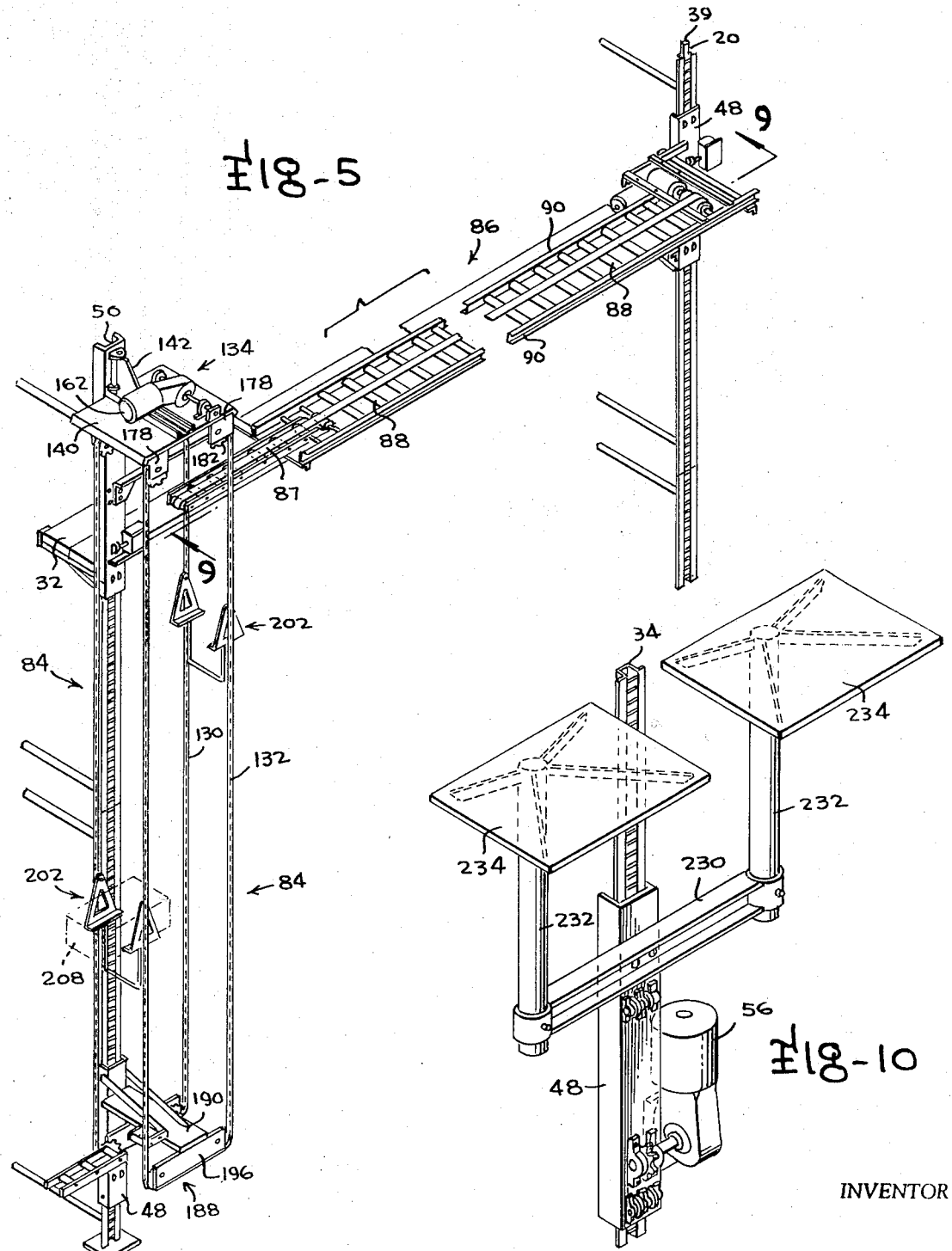

PATENTED DEC 22 1970

SCAFFOLDING AND MATERIAL HANDLING SYSTEM

BACKGROUND OF THE INVENTION

This invention is related to the field of scaffolding and material handling and is specifically directed to a vertically extendible scaffolding system which can be extended upwardly with the progression of work and which includes material handling means for lifting materials from a lower level to the work level for subsequent horizontal distribution of the materials along the work level at a work line. Countless devices have been contrived for the purpose of providing a scaffolding support for materials and workmen during the construction and/or maintenance of buildings and the like. However, the continuing large amount of activity in this field is indicative of the absence of adequate solutions for many of the problems that have arisen in this field. While it is obvious that a scaffolding and material handling system should be versatile, reliable, economical to construct and maintain, safe and easily assembled and disassembled, none of the prior art devices have provided an adequate answer to the needs of the construction and maintenance industry.

For example, vertically extending scaffolding has long been employed in a variety of ways such as through the use of cable lift systems such as shown in U.S. Pats. Nos. 2,762,659 and 3,088,545. Such systems are usually quite complicated and have a limited vertical extent due to the needs for providing cables of unusually long length.

While some of the prior art devices have incorporated material lifting means in the smaller scaffolding systems, such devices have been of limited use and versatility since the position of material lift is virtually unchangeable and it often occurs that such devices are not usable in particular work locations having unique problems. Consequently, it is the usual procedure in large construction sites to provide dual systems in the form of a scaffolding system and a work lifting system for bringing materials to the scaffolding system. Such systems are usually in the form of an elevator frame erected alongside the scaffolding at one end thereof. While such systems are generally satisfactory, they are costly to erect and maintain.

Also, another serious shortcoming of the prior devices is their failure to provide horizontal distributing means for work materials that have been lifted to an upper level on the scaffolding.

Other approaches such as that in U.S. Pat. No. 3,313,376 have involved the use of supplemental material handling elevators and the like connectable to the scaffolding for association therewith. Such devices usually are of limited capacity and form an additional burden of weight to be supported by the scaffolding.

Several of the previously known devices employ a vertically extending rack engageable by a motor driven pinion on a movable carriage as shown in the aforementioned U.S. Pat. No. 3,313,376 and in U.S. Pat. No. 3,207,263. While such systems have functioned satisfactorily for their intended purposes, they have universally required the use of an expensive supplemental individual rack which provides no purpose other than enabling driving engagement of pinion means on the carriage to enable movement of the movable carriage. The instant invention, on the other hand, incorporates a rack member built into the scaffolding structure per se so that the same member performs the dual purpose of supporting the scaffolding and also provides the rack engageable by the pinion for driving movement of the carriage. The construction is extremely efficient in lowering the overall weight of the system with no loss in strength.

Problems of the prior known devices are solved by the instant invention through the provision of a uniquely simple and versatile scaffolding construction in which vertical scaffolding support members of high strength are easily extended upward for supporting the scaffolding and also provides rack means for engagement by pinion means supported on a movable carriage and driven by electric motors for moving the scaffolding. Moreover, a unique material handling conveyor system is provided for distributing and handling work materials in an extremely efficient manner. The system of this invention is economical to construct and maintain and is of great ruggedness and durability. The system's versatility is greatly enhanced by virtue of the fact that a supplemental material lifting elevator means can be associated with any one of the vertical scaffolding columns at the most convenient location. Moreover, a vertical conveyor and lifting system is associated with the horizontal conveyor in a uniquely efficient manner so that the work materials are lifted from ground level and automatically deposited on the horizontal conveyor without manual effort on the part of the workmen. For these reasons, the instant invention provides a vast improvement over the previously known devices in a wide variety of ways.

SUMMARY OF THE INVENTION

Therefore, it is a primary object of this invention to provide a new and improved scaffolding and material handling system.

Obtainment of the object of this invention is accomplished through the provision of a scaffolding formed of a plurality of vertical members each in the form of a U-shaped channel member. Each channel member has horizontal rods extending across the trough of the channel and welded in position to provide a vertically extending rack. A plurality of carriages are mounted for movement along the vertical frame members with each carriage being provided with a motor driving a pinion engageable with the rack. The vertical frame members of the scaffolding are formed in an inboard row alongside the building wall at a work line and an outwardly spaced outboard row. The carriages associated with the inboard row are provided with inwardly extending scaffolding support arms which support scaffolding upon which workmen and materials can be moved upwardly as work progresses. Moreover, the outboard row of vertical frame members is also provided on one side with scaffolding plank supporting members extending from each carriage but is provided on the outboard side with a horizontal conveyor that is power driven for providing a horizontal distribution of materials along the length of the scaffolding system. A vertically oriented conveyor extends downwardly from one end of the horizontal conveyor for lifting materials from ground level or any lower level to automatically deposit the materials upon the horizontal conveyor. The vertical conveyor is in the form of a pair of aligned chain loops having an upwardly moving flight and a downwardly moving flight and having aligned cradle brackets pivotally supported thereon. The cradle brackets are connected by a bail extending downwardly from the lowermost portions of each bracket with the bail serving to maintain the brackets in fixed spaced relationship so that they will not move apart under load. The horizontal conveyor extends between the chains adjacent the top of the downwardly moving flights of the chain loops so as to have materials resting upon the brackets deposited thereon as the cradle brackets move downwardly. However, the lowermost portion of the U-shaped bail is always beneath the horizontal conveyor due to the dimensions of the bail and there is never any possibility of the cradle brackets moving apart so as to accidentally drop the load held thereon. Another feature of this invention resides in the provision of a supplemental work lifting elevator assembly in the form of a carriage having a motor driven pinion and a pair of work supporting platforms with the carriage being associated with any one of the outboard frame members at desired locations to provide a supplemental material lift system.

Therefore, the instant invention provides a scaffolding system that is easily extended vertically while maintaining an efficient material handling operation while the scaffolding is extended upwardly with the system being uniquely simple and reliable so as to be easily erected and maintained by unskilled workmen.

DESCRIPTION OF THE DRAWINGS

FIG. 2 is a front elevational view of a carriage means associated with a vertical frame member of the scaffolding portion of this invention;

FIG. 3 is a sectional view taken along lines 3—3 of FIG. 2;

FIG. 4 is a sectional view taken along lines 4—4 of FIG. 2;

FIG. 5 is a perspective view of the material handling conveyor component of the preferred embodiment;

FIG. 9 is a sectional view taken along lines 9—9 of FIG. 5; and

FIG. 10 is a perspective view of the supplemental material lifting elevator means of the preferred embodiment.

DESCRIPTION OF THE PREFERRED EMBODIMENT

Figure 1:
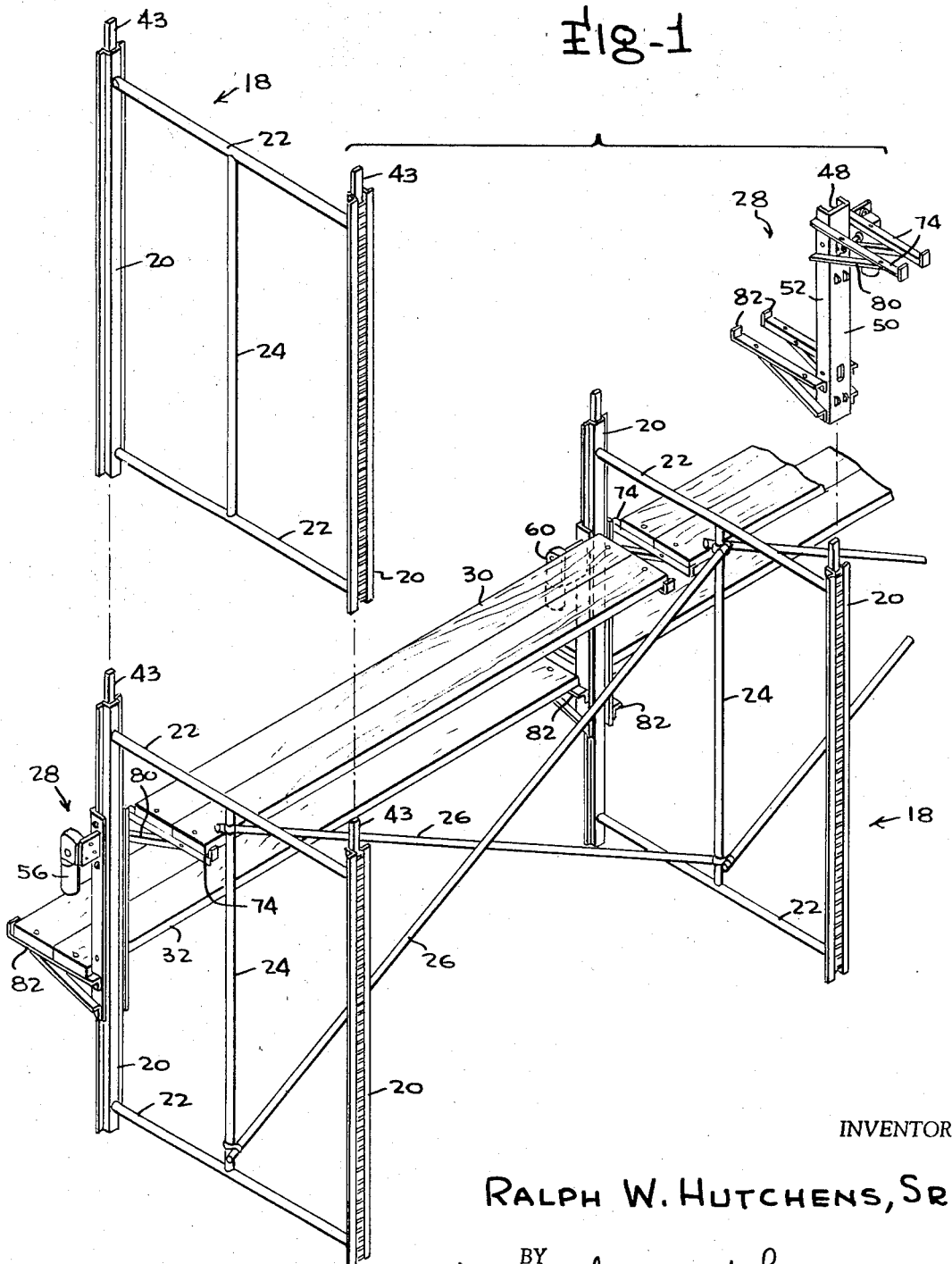
FIG. 1 is an exploded perspective view of a portion of the preferred embodiment of this invention.

Attention is initially invited to FIG. 1 of the drawings which illustrates the primary framework elements of the preferred embodiment of this invention which provides support for the subsidiary components. The scaffolding framework is formed of a plurality of frame units generally designated 18 and having two vertical frame members 20 connected to horizontal connecting rods or bars 22 which are in turn centrally connected by a vertical connecting rod or bar 24. Longitudinally extending cross rods 26 are connected between the vertical rods 24 for providing rigidity between respective units 18.

Individual vertically movable carriages 28 are provided for use with the individual vertical frame members 20 for the purposes to be discussed hereinafter. The carriages 28 associated with the inward frame members 20 of FIG. 1 support a scaffolding planks 30 at an upper level for holding working materials and lower scaffolding planks 32 at a lower level for providing a walkway in support for workmen. The planks 32 form a scaffolding extending along an inward work line such as a building under construction or a building being painted etc. and provides support for the workmen performing the particular function being accomplished. The vertical frame members 20 illustrated in FIG. 1 and having no scaffolding attached form an outward or material receiving line which receives and distributes building materials and the like for use by the workmen.

Any desired length of overall assembly can be achieved by the use of plural units 18 which can be extended transversely to any desired extent and can be extended vertically in a stacked manner by means discussed hereinafter as shown in FIG. 1. FIG. 5 illustrates the material handling conveying system associated with the outward material handling line which will be discussed in detail hereinafter. A conveyor system supported by the framework is not illustrated in FIG. 1 since such an illustration would serve to obscure the framework portion of the preferred embodiment.

Each vertical frame member 20 is formed of a U-shaped channel member 34 (FIG. 4) having a base portion 36 and first and second legs 38 with the outer ends of the legs being connected by a plurality of equidistantly spaced parallel rods 40 which form a vertically extending rack engageable by pinion means on each of the carriages 28 for moving the carriages vertically along the vertical frame members. Moreover, the outer ends of the legs 38 have first and second laterally extending curved track members 42 as shown in FIG. 4. Track members 42 are engaged by rearward rollers 44 and forward rollers 46 of the carriage 28 associated with the particular vertical frame member. It should be noted that rollers 44 have a concave periphery for engaging the arcuate surface of track member 42 whereas rollers 46 have an arcuate periphery receivable in the curved groove formed in the track member on the other side of the tracks opposite to rollers 44.

A vertical rod connector member 43 is welded in the space between the base 36, legs 38 and rods 40 on the upper ends of each of the vertical frame members as shown in FIG. 1. Consequently an adjacent upper frame unit can be easily slipped over the connector member 43 to provide a vertical extension of the scaffolding assembly in an obvious manner.

Each carriage 28 comprises an elongated main carriage frame 48 which is in the form of a U-shaped channel having a base 50 and spaced legs 52 which fit over the vertical frame members 22 as shown in FIGS. 2—4. FIG. 1, in its upper right corner, illustrates a perspective view of the carriage construction separated from association with the vertical frame members 20. A motor support plate 54 (FIG. 2) is attached to one of the legs 52 and provides support for a carriage drive motor 56 attached to plate 54 by support bracket 58 and having its output connected to a stepdown worm and pinion drive transmission 60. A horizontally extending output shaft 62 from transmission 60 extends through a pair of bearing brackets 64 attached to the outer surface of base 50 of the main frame element of the carriage. A drive pinion 66 is keyed to shaft 62 between bearing brackets 64 and extends through one of two rectangular openings 68 formed in base 50 to mesh with the rack provided by rods 40 (FIG. 3). A pair of roller bearing brackets 70 are provided immediately beneath pinion 66 and adjacent the lower portion of the carriage as shown in FIG. 2 to form support for the forward rollers 46. Each of the forward rollers 46 extends through small rectangular openings in base 50 for engagement with tracks 42 as shown in FIG. 4. The rearward rollers 44, on the other hand, are mounted for rotation on bearing shafts 72 affixed to legs 52 of the main frame of the carriage as best illustrated in FIG. 4. The roller-track relationship is such that the carriage is solely capable of vertical movement as will be obvious from inspection of FIG. 4. It should also be noted that there are two pairs of rearward rollers 44 spaced along the length of the carriage as shown in FIG. 3.

The scaffolding support 74 is provided with slots 76 (FIG. 3) having a large end and a narrow end which fits over a pin 78 extending from leg 52. Horizontal retention of the upper scaffolding support arm 74 is provided by a brace member 80 connected to the support arm and to the leg 52. Similarly, a pair of upper scaffolding support arms 82 (FIG. 1) are connected to the lower end of the main carriage frame 48 to extend in opposite direction from the upper support arms. Upper scaffolding support planks 30 are supported on the upper arms 74 and the lower scaffolding support planks 32 are supported on the lower arms 82 in an obvious manner as shown in FIG. 1. It should be noted that the positioning of the respective upper and lower planks on opposite sides of the vertical frame members 20 provides for a balancing of forces so that the carriages are not subjected to undue torsional strain.

It should be noted that a wide variety of devices can be attached to the main carriage frame members in accordance with the particular work being performed. Several different examples of such devices are discussed hereinafter.

When it is desired to move the scaffolding in a vertical direction, the motors on all the carriages supporting the scaffolding are actuated simultaneously so as to provide for such movement. However, a single motor connected by shafting to all carriages could be employed if desired. The drive means fixedly locks the pinion upon deactivation of motor 56 so that there is no problem in retaining the carriage in position. Moreover, dog means or any other similar latch means could be employed for engagement with the rack means as an added safety feature if desired.

FIG. 5 illustrates a material handling conveyor system associated with the forward line of vertical members 20 (those closest to the viewer in FIG. 1) for distributing work materials or the like along the scaffolding. The conveyor system is supported upon first and second carriage members employing a main carriage frame and associated rollers in the identical manner of the previously discussed carriage means supporting the scaffolding with the only difference being in the provision of conveyor supporting means in place of scaffolding supporting means. The conveyor system comprises a vertically extending lift conveyor generally designated 84 and a horizontally extending conveyor generally designated 86.

Horizontally extending conveyor 86 is provided over a major portion of its extent with a plurality of large idler rollers 88 having a traveling belt 87 supported by a pair of elongated support frame members 90 connected on the downstream end of the conveyor to a conveyor supporting bracket frame 100 (FIG. 8) to which, is in turn, connected a main carriage frame member 48 which supports the downstream end of the conveyor. The upstream support for frame members 90 is provided by a transverse support 102 which extends outwardly from an offset frame 104 connected to the main carriage frame 48 of the carriage supporting the upstream or forward end of the conveyor. The extreme upstream portion of conveyor 86 is supported by a relatively narrow pivot frame formed of pivotal elements 104 pivoted to a pivot shaft 106 and supporting a plurality of smaller idler rollers 107.

Pivot plates 104 are retained in a horizontal position illustrated in FIG. 9 by means of a latch lug 109 extending from the downstream end thereof and engaging the underside of a latch rod shaft 108. However, the pivot frame elements 104 can be pivoted upward to the dashed line position of FIG. 9 for enabling the use of the vertical conveyor 84 for lowering items from a higher level to a lower level in a manner that will become apparent from the description of the vertical conveyor.

Figure 8:
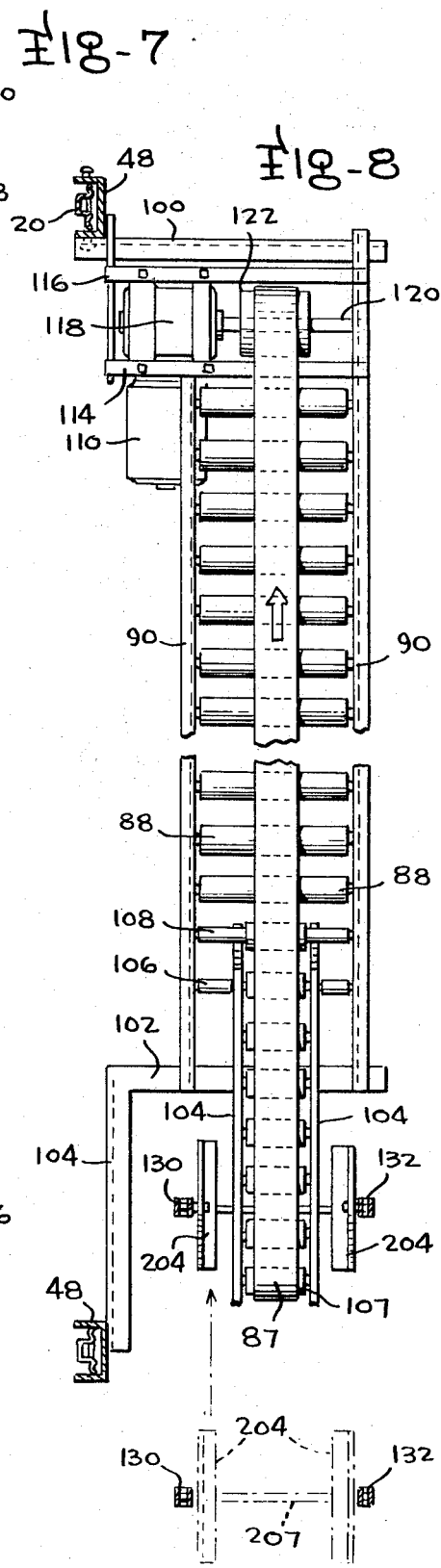
FIG. 8 is a sectional view taken along lines 8—8 of FIG. 7.

Drive for belt 87 is provided by a conveyor drive motor 110 which is supported on the downstream end of the conveyor by a pair of transversely extending motor support elements 114 and 116 illustrated in FIG. 8. Motor 110 drives a transmission 118 having an output shaft 120 to which is keyed a main conveyor drive roller 122. Belt 87 is tensioned by means of fixed idlers 124 (FIG. 9) supported on the lower side of frame members 90 and a pivot roller 126 supported on the end of a pivot bracket 128 pivoted to the frame at 130.

Figure 7:
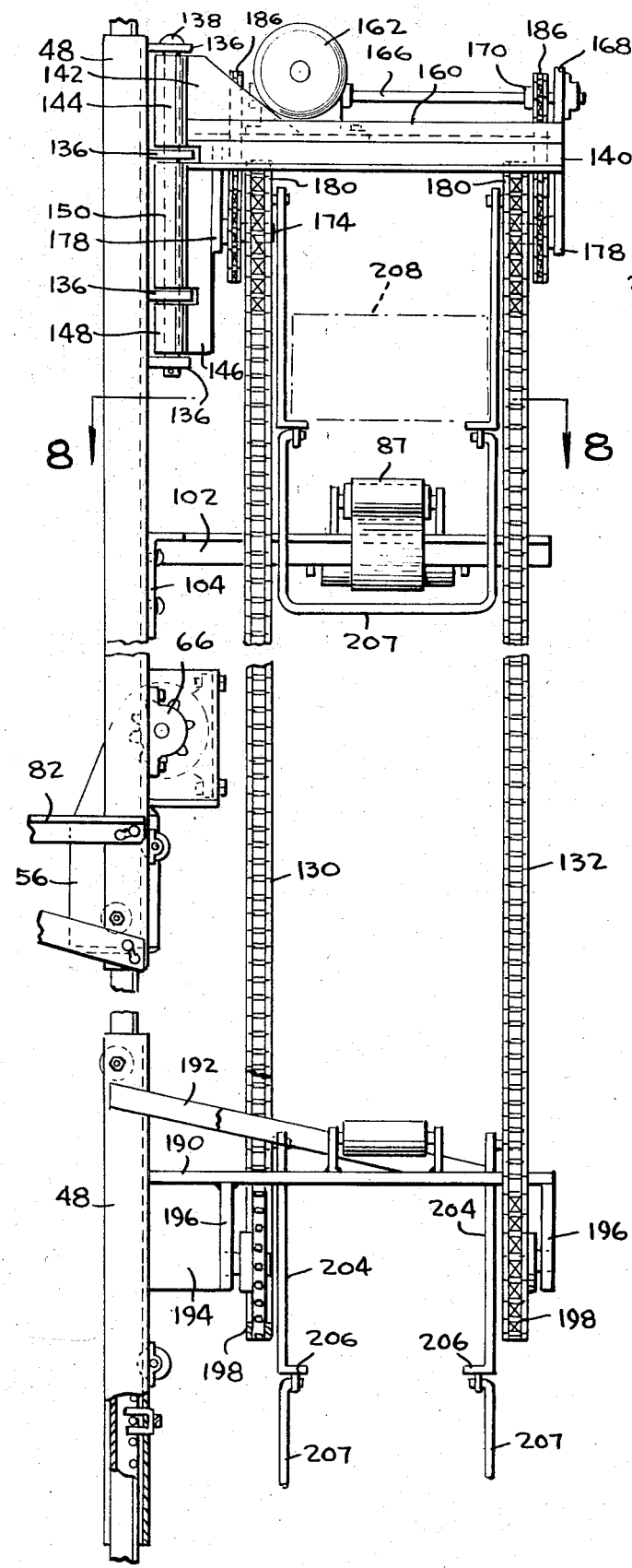
FIG. 7 is a side elevational view of the vertical conveyor system.

Vertical conveyor 84 is formed of first and second chain loops 130 and 132 perspectively illustrated in FIG. 5 and which are supported by a conveyor support plate assembly generally designated 134 in FIG. 5. Support plate assembly 134 is connected to the base 50 of a carriage of the type described previously. The upper end support of vertical conveyor 84 is hingedly connected to the carriage by the provision of apertured plates 136 extending from base 50 and receiving an elongated pin 138 as shown in FIG. 7. A horizontal support plate 140 is pivotally connected to pin 138 and is rigidly maintained in position by bracing 142 welded to a pipe section 144 serving as a pivot bearing through which pin 138 extends. Moreover, additional bracing is provided by a second brace plate 146 welded to two lower pipe sections 148 and 150. Additional bracing of plate 140 is provided by a pair of angles 160 welded to the top of the plate. A drive motor 162 for the chain loops 130 and 132 is attached to the top of plate 140 and is connected to a stepdown transmission 164 which has its output connected to a transverse conveyor drive shaft 166 having an outer drive sprocket 170 keyed thereto adjacent plate 168 and an inner drive sprocket 172 keyed to the other end adjacent the transmission as shown in FIG. 7.

Figure 6:
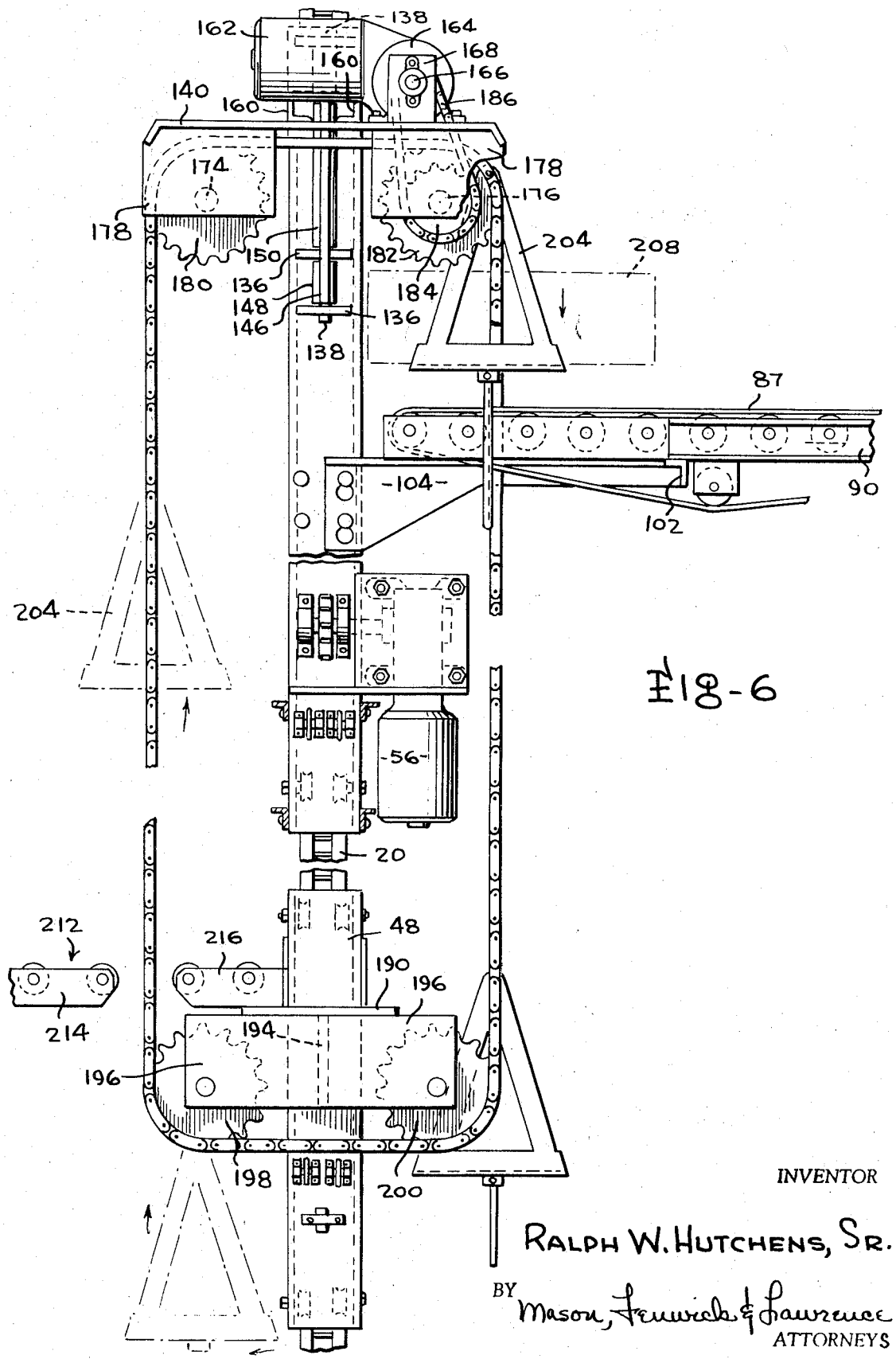
FIG. 6 is an elevational view of the vertical conveyor portion of the material handling component.

Support for the two chain loops is provided by two pairs of stub shafts 174 and 176 respectively connected and supported by four support plates extending downwardly adjacent the corners of plate 140 as shown in FIGS. 5, 6 and 7. Shafts 174 support two idler sprockets 180 which provide the support for upwardly moving flights of chain loops 130 and 132. Moreover, each of the stub shafts 176 is provided with a driven sprocket 184 affixed to a chain driver sprocket 182. The driven sprockets 184 are driven by chains 186 respectively connected to two drive sprockets 170 and 172 keyed on shaft 166 in an obvious manner. The drive sprockets 182 support the downward moving flight of each of the conveyor chains 130 and 132 as shown in FIG. 6. That portion of the chain between sprockets 180 and 182 comprises a horizontal flight as evidenced by FIG. 6.

The lower ends of chain loops 130 and 132 are maintained in position by means generally designated 188 in FIG. 5 and which is mounted on a main frame carriage 48 having front and rearward rollers associated with the vertical frame members 20 in the same manner as the previously discussed carriage frames. However, no motor is provided on the frame 48 since the carriage assembly 134 supporting the upper end of the chain loops is provided with a motor and drive pinion assembly capable of moving the entire vertical conveyor assembly means along the vertical member with which it is associated as shown in FIG. 7, if such is desired. Moreover, the lower ends of the carriage supporting the upper end of the vertical conveyor is provided with a lower scaffolding support arm 82 for supporting a plurality of lower planks 32 as shown in FIG. 5.

The position maintaining means 188 for maintaining the position at the lower end of the chain loops 130 and 132 includes a horizontally extending frame plate 190 extending outwardly from carriage frame 48 and braced by diagonal braces 192 as shown in FIG. 7. Moreover, a vertical plate 194 provides additional bracing for the horizontal plate 190. A pair of downwardly extending vertical plates 196 are provided adjacent the respective chain loops and each of the plates 196 has a forward idler sprocket 198 and a rearward idler sprocket 200 with the respective chain loops being fitted over sprockets 198 and 200 so that the portion of the chain loops between sprockets 198 and 200 forms a horizontal flight as shown in FIG. 6.

Means for engaging and supporting work materials to be lifted upwardly by the vertical conveyor is provided on the chain loops 130 and 132 and comprises a plurality of lifting units 202. Each lifting unit consists of a pair of load supporting cradles 204 respectively aligned on the two chain loops 130 and 132. Each cradle is pivotally connected to its chain and has a horizontally extending load engaging and supporting flange 206 extending inwardly as shown in FIG. 7. A rigid load is supported on the flanges and a U-shaped bail member 207 which is connected to the cradles 204 to prevent the cradles from spreading apart to release the load 208 supported by flanges 206.

Materials to be lifted by the vertical conveyor are moved to a position adjacent the vertical conveyor by a horizontal lower level infeed conveyor means generally designated 212 in FIG. 6. Conveyor 212 is merely a roller conveyor and extends inwardly between the upward moving flights of chain loops 130 and 132 extending between the sprockets 180 and 198. However, it should be noted that conveyor means 212 is supported by two separated frame members 214 and 216 between which a space exists which enables the passage of the conveyor mounted bail etc. in an obvious manner from inspection of FIG. 6. Frame means 216 is supported on plate 190 while frame 214 is supported on any other convenient support (not shown). An item 208 to be lifted upwardly is moved inwardly along conveyor 212 and positioned between the upwardly moving flights of chains 130 and 132 so that the next lifting unit 202 to move past the item to be lifted will engage the item by means of flanges 206 and lift the item upwardly. Obviously, it is necessary that the lifted item be of sufficient length or width to rest upon the flanges 206.

The lifted item is lifted from conveyor 212 and carried vertically by the upwardly moving flight of the chain loops until it reaches the horizontal flight between sprockets 180 and 182. This flight moves the load horizontally until it reaches the downwardly moving flight of the chain loops extending between sprockets 182 and 200. The narrow upstream end of conveyor 87 extends between the downwardly moving flight of loops 130 and 132 so that the load 208 is deposited upon the conveyor 86 to begin horizontal movement along the length thereof. It should be noted that the lowermost horizontal portion of bail 207 is always beneath the upstream end portion of conveyor 87 extending between the downwardly moving flights as shown in FIGS. 6 and 7. Consequently, the conveyor does not interfere with the movement of the lifting units and the bail 207 is always effective for maintaining the cradles in proper position. Therefore, it will be seen that the conveyor system provides a uniquely efficient system for lifting materials from ground level to an upper level for horizontal distribution along conveyor 86. Workmen on the scaffolding 32 associated with the conveyor 86 can easily lift the materials from the conveyor to deposit them for storage on the work line upper scaffolding planks 30 illustrated in FIG. 1. The materials are consequently readily available for workmen along the work line.

Another aspect of the instant invention resides in the provision of a supplemental elevator means for lifting materials along the vertical frame members 20 which is illustrated in FIG. 10 of the drawings. This supplemental elevator means is mounted on a conventional carriage frame member 48 identical with the previously discussed carriage frames and having guide rollers and a motor 56 for moving the carriage along the vertical member. However, a horizontal support frame 230 is connected to the carriage frame 48 and has first and second rods 232 affixed to each end. The tops of rods 232 have a flat platform 234 for lifting work materials or other items. The platform 234 extends forwardly as shown in FIG. 10 so that they will not interfere with any bracing elements or the like located behind the U-shaped channel 34 as illustrated in FIG. 10. Moreover, the platforms 234 are spaced away from the vertical frame member a sufficient distance so as to clear the sides of any carriage frame 48 that the platforms might be moved upwardly adjacent to. For example, the assembly could be moved upward on the vertical frame member 20 supporting the downstream end of the horizontal conveyor 86 in FIG. 5 to a position wherein platforms 234 would be substantially aligned with planks 32. This would enable the workmen to remove material carried by the platforms in an easy manner.

Therefore, it will be seen that the instant invention provides a uniquely efficient and effective means for providing support for workmen and material and also provides an efficient means for moving working materials to the workmen along the building line. The device is extremely versatile in that it can be extended upwardly and transversely an desired amount and is simple and easy to erect.

It should be understood that many variations will occur to those skilled in the art and that this invention is limited solely to the combinations of the appended claims.

I claim:

1. A modular unitary metal scaffolding and material handing system adapted for providing a vertically extended construction assembly by connection with like units in stacked array, said system comprising a plurality of spaced frame units each having two connected relatively fixed vertical frame members with each vertical frame member comprising an elongated U-shaped channel member having a vertical trough formed between two leg portions connecting a base portion, rack means formed in said vertical frame members comprising a plurality of parallel rods extending between and fixed to the said leg portions, a plurality of traveling carriages movably associated with said vertical frame members for upward and downward movement along said vertical frame members, means extending between said carriages for providing a platform, power means supported on each of said carriages, pinion means drivingly connected to said power means and engageable with said parallel rods comprising said racks for moving said carriages and platform vertically along the length of said vertical members and connector means attached to the upper end of said vertical members for enabling an attachment of another of said vertical members in axial alignment with said vertical members so as to provide a vertical extension of said system.

2. The invention of claim 1 wherein each of said carriages includes a main movable elevator frame member extending parallel to said channel members for movement along said channel and upper and lower horizontal support arms extending from said main movable elevator frame member for respectively supporting a front and rear platform on the front and rear sides of said vertical members with which said carriages are associated.

3. The invention of claim 2 wherein said elongated channel members include first and second laterally extending track members extending laterally from the ends of said leg portions and said movable elevator frame includes roller means mounted in rolling contact with said track members.

4. The invention of claim 3 wherein said track members are of curved cross-sectional construction so that one side of each of said track members forms a relatively narrow curved depression or groove extending along the length of said track member and the other side of said track member forms a rounded arcuate surface extending along the other side of said track member with said roller members comprising a first set of rollers of relatively narrow axial width having an outer periphery matingly received in said relatively narrow groove in said track members and a second set of rollers of wider width and provided with an inwardly extending concave circumferential groove embracing said curved outer surface of said track members so that said track members are received between said two sets of rollers and restrain movement of said carriage means solely to movement in a direction parallel to the axis of said channel members.

5. The invention of claim 4 wherein said movable elevator frame member comprises a U-shaped channel member having a base of greater width than the total width of said vertical frame member and its associated tracks with said U-shaped channel member receiving said vertical frame member within the confines of the space defined by the legs of said U-shaped channel member and the base of said U-shaped channel member so that said tracks are closely spaced adjacent the base of said U-shaped channel member.

6. The invention of claim 5 wherein said second set of rollers is mounted on the legs of said U-shaped member on the interior of said member and said first set of rollers is mounted on support means attached to the outside of the base of said U-shaped member to extend through openings in said U-shaped member.

7. The invention of claim 6 wherein said means for connecting said vertical frame members in axially aligned manner comprises a rigid elongated mating member received in a space defined by the interior of said U-shaped portion of said vertical members and said rod members.

8. The invention of claim 7 wherein said pinion is rotatably supported on brackets attached to the outside of said base member of said movable U-shaped frame and connected to a motor means for driving rotation with said pinion extending through an opening in the base of the U-shaped frame and being meshed with said rod members so that such driving rotation results in movement of said carriage along the length of said vertical members.

9. The invention of claim 1 wherein said vertical frame members are respectively arranged in an inward row adjacent a work line and an outward row laterally spaced from the inward row on the opposite side of the work line with each of said carriages including a main movable elevator carriage frame member extending parallel to said channel members for movement along the length of said channel members and upper and lower horizontal support arms extending from the said elevator frame members associated with said vertical members in said inward row for respectively supporting an inward platform and a rearward platform on the inward side and the outward side respectively of said vertical members of said inward row, an inwardly extending lower support arm extending inwardly from the lower ends of said main movable elevator carriage frame members of said carriages in said outward row for supporting a platform between adjacent carriages and horizontal conveyor means having an upstream and a downstream end respectively supported by and supported outwardly of said movable elevator frame carriage members, two of said outward row carriages and a vertical conveyor means mounted outwardly of and by the carriage supporting the upstream end of said horizontal carriage for moving materials from ground level to said horizontal conveyor to enable distribution along the length of said scaffold system.

10. The invention of claim 9 wherein said vertical conveyor means comprises first and second aligned chain loops, each of said chain loops being supported by first and second upper aligned sprocket members so that the first sprocket members support an upward moving chain flight and the second sprocket members support a downward moving chain flight with said upward moving chain flight and said downward moving chain flight being connected respectively by upper and lower horizontal flights with the upstream end of said horizontal conveyor extending between said downward moving flights a fixed distance below said upper horizontal flight of said vertical conveyor, a plurality of lifting units on said chains, each load lifting unit comprising a first pivotally supported cradle bracket connected to one of said chains and a second pivotally supporting cradle bracket connected to the other chain in alignment with said first pivotally supported cradle bracket and flange means extending inwardly from the lower portion of said pivotally supported cradle brackets for supporting a load between said brackets and including bail means connecting said brackets for preventing outward movement of said brackets away from each other.

11. The invention of claim 10 wherein said bail means comprises a U-shaped rod member having vertical legs and a horizontal base portion with said legs being individually connected to different ones of said brackets and extending downwardly a sufficient distance so that said base portion of said bail member is always below said horizontal conveyor.

12. The invention of claim 11 additionally including supplemental elevator means comprising a carriage frame member, roller means connecting said carriage frame member to one of said vertical frame members for movement along said vertical frame member, motor means connected to said carriage frame member, pinion means drivingly connecting said motor means to said rack means of said vertical frame member for moving said carriage frame member along said vertical frame member upon actuation of said motor means, a horizontally extending bracket connected to one side of carriage frame member, material supporting platforms connected to and supported by each end of said horizontal bracket and outwardly oriented with respect to said vertical frame member with which said supplemental elevator means is associated.

13. The invention of claim 9 wherein said elongated U-shaped channel members include first and second laterally extending track members extending laterally from the ends of said leg portions and said movable elevator carriage frame member includes roller means mounted in rolling contact with said track members.

14. The invention of claim 13 wherein said track members are of curved cross-sectional construction so that one side of each of said track members forms a relatively narrow curved depression or groove extending along the length of said track member and the other side of said track member forms a rounded arcuate surface extending along the other side of said track member with said roller members comprising a first set of rollers of relatively narrow axial width having an outer periphery matingly received in said relatively narrow groove in said track members and a second set of rollers of wider width and provided with an inwardly extending concave circumferential groove embracing said curved outer surface of said track members so that said track members are received between said two sets of rollers and restrain movement of said carriage means solely to movement in a direction parallel to the axis of said channel members.

15. The invention of claim 14 wherein said movable elevator frame member comprises a U-shaped channel member having a base of greater width than the total width of said vertical frame member and its associated tracks with said U-shaped channel member receiving said vertical frame member within the confines of the space defined by the legs of said U-shaped channel member and the base of said U-shaped channel member so that said tracks are closely spaced adjacent the base of said U-shaped channel member.

16. The device of claim 15 wherein said second set of rollers is mounted on the legs of said U-shaped member on the interior of said member and said first set of rollers is mounted on support means attached to the outside of the base of said U-shaped member to extend through openings in said U-shaped member.

17. The invention of claim 16 wherein said vertical conveyor means comprises first and second aligned chain loops, each of said chain loops being supported by first and second upper aligned sprocket members so that the first sprocket members support an upward moving chain flight and the second sprocket members support a downward moving chain flight with said upward moving chain flight and said downward moving chain flight being connected respectively by upper and lower horizontal flights with the upstream end of said horizontal conveyor extending between said downward moving flights a fixed distance below said upper horizontal flight of said vertical conveyor, a plurality of lifting units on said chains, each load lifting unit comprising a first pivotally supported cradle bracket connected to one of said chains and a second pivotally supporting cradle bracket connected to the other chain in alignment with said first pivotally supported cradle bracket and flange means extending inwardly from the lower portion of said pivotally supported cradle brackets for supporting a load between said brackets and including bail means connecting said brackets for preventing outward movement of said brackets away from each other.

18. A material handling system for lifting a rigid load from a lower station for deposit at an upper station, said system comprising first and second endless chains oriented in relative spaced alignment with each other to extend between said stations, means for supporting and driving sprockets upon which said chains are oriented in an upwardly moving flight laterally spaced from said upper station and a lowering moving flight with said upper station being positioned between the chains of the lowering flight adjacent the upper end of the lowering moving flight, work lifting units comprising first and second aligned load supporting cradles respectively pivotally supported at their upper ends to each of said chains in alignment and having load supporting flange surfaces adjacent their lower ends so that a load deposited on said cradles at said lower station extends between said cradles and is lifted upwardly as said cradles move along the lifting flight and is then moved to a position above the upper station for downward movement to be deposited on the upper station with the cradles continuing downwardly for subsequent reloading and U-shaped bail means formed of two downwardly extending legs each connected respectively to the bottom portion of one of said cradles and a horizontally extending portion extending from and connecting the lower ends of said downwardly extending legs for retaining said cradles a fixed distance apart and wherein the length of said downwardly extending legs is sufficient to position said horizontally extending portion a sufficient distance below said cradles so that said horizontally extending portion is always lower than said upper station and does not pass through said upper station.